Figure 1:
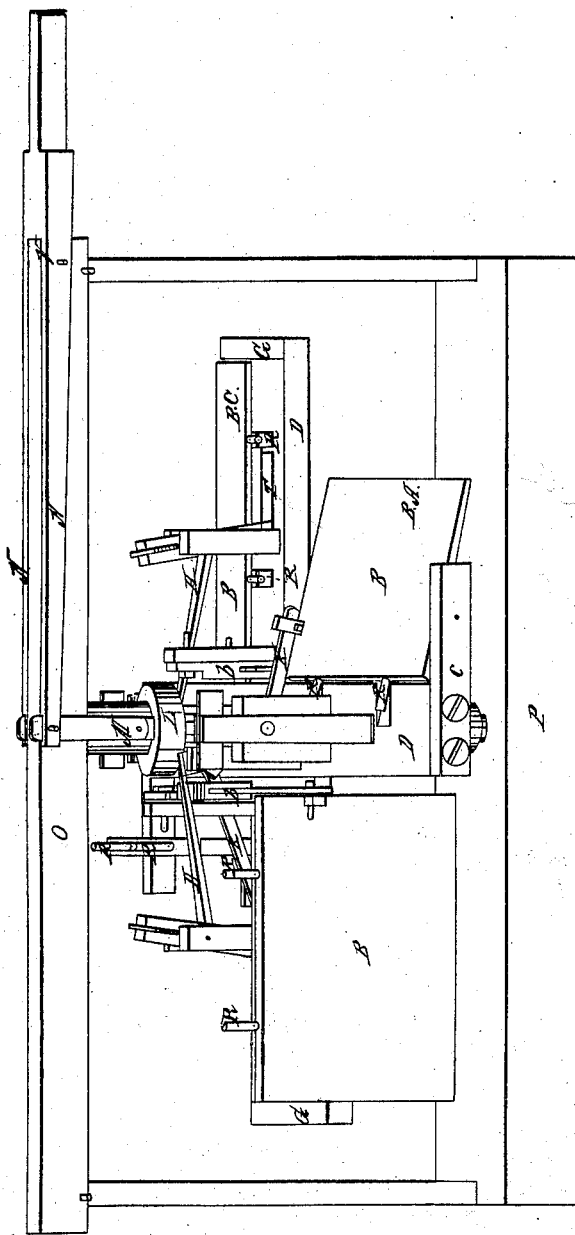

P. Chesley,
Water Wheel.

Nº 15,970.                    Patented Oct. 28, 1856.

Witnesses:
Marcus P. Norton
Levi Rice Jr

Inventor:
Plumer Chesley

UNITED STATES PATENT OFFICE.

PLUMER CHESLEY, OF CANDIA, NEW HAMPSHIRE.

CURRENT-WHEEL.

Specification of Letters Patent No. 15,970, dated October 28, 1856.

*To all whom it may concern:*

Be it known that I, PLUMER CHESLEY, of Candia, in the county of Rockingham, State of New Hampshire, have invented a new and Improved Mode of Driving Machinery by Wind or Water, and is named a "Wind or Water Wheel;" and I do declare that the following is a full and exact description of the nature, construction, and operation thereof, reference being had to accompanying drawings and to the letters of reference marked thereon.

*Nature of the invention.*—It consists in providing for a wind or water wheel, with an upright shaft containing one or more set of wheels, each set of wheels to contain four arms, and to each arm, a revolving fan or float. When two wheels are used, the upper wheel is placed at any desired distance from the lower, with its arms and revolving fans or floats, hanging in a perpendicular line over and at an equal distance between the arms of the lower, and if more wheels are used upon the same shaft no set of fans or floats hang in a perpendicular line over any of the wheels below If desired, the wheel may be operated by wind and water combined. In that case there must be two wheels at least upon the same shaft, one acting in the wind, the other in the water. The revolving fans or floats are regulated by means of a regulator, which allows the surface of the fans or floats to the action of the current of wind or water according to the force and power of that current, which regulator may be, and is used by man power to stop and start said wind or water wheel, which is done by means of a sliding ring connected to a lever by means of a connecting rod or rods.

Having now given the nature, I will give the construction of my invention for the purpose of enabling those skilled in the art to build the same.

*Construction.*—In my invention I use a frame of any required size and shape, and of any kind of material suitable. Its different parts are as follows, viz.: The upright shaft (A) Figure 2, revolves upon a center point in the bed piece (P) and in a common journal box in the top pin (O) both in Figs. 1 and 2. At the top or bottom of this shaft may be placed the driving pulley not shown in the model or drawing. To the shaft (A) in Fig. 2, are fastened the arms (D and D) in Figs. 1 and 2, which cross each other at right angles in the center, and are made secure upon the shaft (A). At each end of the arm (D and D) are small arms (C and C) in Figs. 1 and 2, and at right angles with the arms (D and D). These arms are made fast to D, and for the purpose of holding one end of each of the revolving fans or floats (B) in Fig. 2, which are constructed of wood, iron or canvas, and as follows, viz. they are made in the shape of an oblong square, with points of bearing upon, or at each end, nearer the upper side, with one third of the fan or float above said bearing, and two thirds below. The lower side, which is the part acted upon by the wind or water to open and give the entire surface of the said fan or float (B) to the full action of the wind or water, is made very much thinner than the upper side, so as to make it lighter and more easy to be balanced by the weights (R and R) in Figs. 1 and 2, which are for the purpose of keeping an equilibrium in the fan or float (B) Fig. 2. At the inner end of the fan or float (B) is a connecting rod (K and K) in Figs. 1 and 2, which turns on a pivot bolt at (S) Fig. 2, and extends to the lever (J and J) Figs. 1 and 2, and at the lower end of (J), turns upon a pivot bolt. The lever (J) turns upon a pivot bolt at the upper end in the standard (I) Fig. 2, which is firmly fastened in the arm (D) and made of any desired height. At any required distance from the upright shaft (A) and in and upon the arm (D) Fig. 2, is a mortise or "slot" (T and T) Figs. 1 and 2, for the purpose of giving free action to the regulating weight (E) Fig. 2. At each side said mortise (T) is a standard firmly fastened to the arm (D), which standard is (F) Fig. 2, and is for the purpose of holding the regulating weight (E), which is constructed with its lower end, the heaviest, by means of some metallic substance, which may be stationary or movable upon an arm outside of (E) at or near the lower end of it, but when made stationary and without the extra arm, as above proposed, it shall remain stationary at the lower end of (E). Above the center and nearer the upper end of (E) is the point of bearing in the standard each side of the mortise or "slot" (T) Fig. 2. At the upper end of the regulating weight (E) is (G) a surface to counter balance the pressure upon the arm and regulating weight (E).

Figure 2:
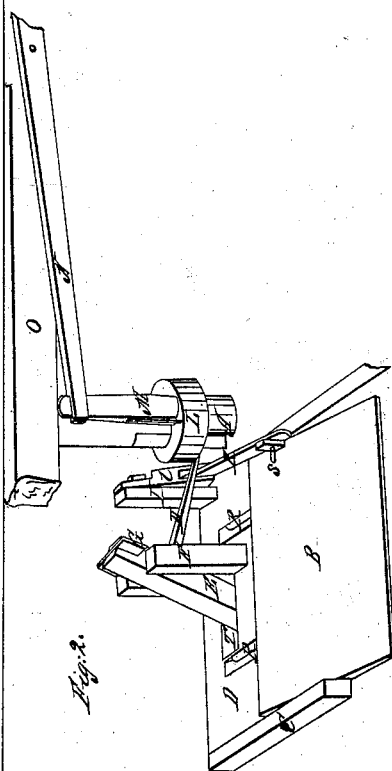

The arm (H and H) Figs. 1, and 2, is fastened to the arm of the regulating weight (E), upon any required angle, at or near the point of bearing. It is placed upon an angle, so as always to be above a level of the point of bearing, and never below by its own weight, when the wheel is at rest. It extends to the upright shaft (A) over and upon the lever (J) before mentioned with a ratchet upon its upper end. The arm (H) Fig. 2, is governed up and down by a groove in the shaft (A), or cast iron plates fastened upon said shaft, with grooves in said plates. The mortises through the shaft (A) as represented in the model are not necessary. Above the arm (H) Fig. 2, and around the upright shaft (A) is a sliding ring (L) for the purpose of stopping and starting the wheel by the power of man. Upon opposite sides of the ring (L) is a rod (M), having joints at each end, and connecting the ring (L) with the main lever (N), which is constructed of two arms (N and N) Fig. 1, and uniting at, or near the point of bearing at (V) Fig. 1.

Having now set forth a description of my invention I will give its operation, which when used as a water wheel is a "submerged wheel".

*Operation.*—In Fig. 1, the wheel may be seen as when operating by wind or water. The revolving fan or float (B) at the left hand side is fully open, and being operated upon by wind or water from the point of sight. The fan or float (B, A) Fig. 1, is closed by the action of the current of wind or water, and remains thus closed until it passes to the left, when it opens as seen at (B,) Fig. 1, and remains open until it passes the opposite point to the right, when it lifts and closes by the action of the current on the under side, as seen at (B, A, and B, C) Fig. 1, and remains thus closed, until it again passes to the left of a line with the current when it opens again as seen at (B), Fig. 1. The fans or floats are placed upon an angle of from not less than 10 or more than 15 degrees, so that, it shall not close upon a level line, and thus prevent the action of the current upon it to open and give its full surface to the wind or water. A less angle would prevent the ready opening of the fan or float, while a greater than 15 degrees would retard the motion of the wheel. The pivot bolt at (s) is placed upon an angle of 45, degrees from a horizontal line through the point of bearing, when the fan or float is open to the full action of the current, and the connecting rod (K) Fig. 2, uniting with the lever (J) as seen in Figs. 1, and 2, is governed by the lever (J) which lever is governed by the arm (H) of the regulator, when the fan or float as seen in Fig. 2, passes around to close by the action of the current, the regulator being left free, will adjust itself to the speed of the wheel. The arm (H) of the same, rises or lowers as the speed increases or is retarded. As the speed increases, the arm (H) lowers, and allows a corresponding opening of the fan or float to the action of the current of wind or water. The ratchet upon the lever (J) is so made as to admit of the free passing down of the arm (H) by the action of the ring (L) upon said arm, and prevents the slipping back of the arm (H) which arm acts upon the lever (J) in the closing of the fan or float (B) Fig. 2. The ring (L) slides up and down upon the shaft (A) by depressing or raising the lever (N). When the wheel is to be stopped depress the lever (N) which acts upon and closes the fans or floats; when they are to move, raise the lever (N) which leaves the fans or floats to be adjusted by the current, by means of the raising of the arm (H) which is done by the regulating weight (E and E). If the motion of the wheel is required to be reversed, change the fans or floats upon the opposite side of the arm (D D) and connecting them with other parts of the wheel to correspond with said arrangement, when two or more set of wheels are used upon the same shaft, the same arrangement as described above for stopping and starting, or its equivalent is used, which is done by means of rods connecting one with the other, so that the action upon one is the action upon all others alike as the first.

What I claim as my invention and desire to secure by Letters Patent, is—

1. The regulators as herein described and arranged.

2. I claim the entire arrangement for starting and stopping the wheel as I have herein made known.

PLUMER CHESLEY.

Witnesses:
 MARCUS P. NORTON,
 LEVI RICE, Jr.